United States Patent [19]
Takada et al.

[11] Patent Number: 6,120,920
[45] Date of Patent: Sep. 19, 2000

[54] MAGNETO-RESISTIVE EFFECT MAGNETIC HEAD

[75] Inventors: Akio Takada; Moriaki Abe; Tadayuki Honda; Hiroaki Narisawa; Takuji Shibata, all of Miyagi, Japan

[73] Assignee: Sony Corporation, Tokyo, Japan

[21] Appl. No.: 09/196,562

[22] Filed: Nov. 20, 1998

[30] Foreign Application Priority Data

Nov. 20, 1997 [JP] Japan .................................. 9-320146

[51] Int. Cl.[7] .................................................. B32B 9/00
[52] U.S. Cl. ........................ 428/693; 428/699; 428/701; 428/702; 428/900
[58] Field of Search .................................. 427/693, 699, 427/701, 702, 900

*Primary Examiner*—Bernard Pianalto
*Attorney, Agent, or Firm*—Hill & Simpson

[57] ABSTRACT

A magneto-resistive effect type magnetic head employing a spin valve film in which the direction of magnetization of a free layer is constant even in the absence of an external magnetic field to assure magnetic stability. The magneto-resistive effect type magnetic head includes a magneto-resistive effect film of a planar substantially rectangular configuration, having its longitudinal direction substantially perpendicular to a magnetic recording medium sliding surface, a first electrode connected to a longitudinal end of the magneto-resistive effect film, a second electrode connected to the other longitudinal end of the magneto-resistive effect film and hard magnetic films arranged on both ends along the width of the magneto-resistive effect film. The magneto-resistive effect film is made up of at least a first ferromagnetic layer, a non-magnetic layer, a second ferromagnetic layer and an anti-ferromagnetic layer, layered together. The hard magnetic films has an electrical resistance larger than that of the magneto-resistive effect film.

4 Claims, 11 Drawing Sheets

MAGNETO-RESISTIVE EFFECT MAGNETIC HEAD

BACKGROUND OF THE INVENTION

1. Field of the Invention

This invention relates to a magneto-resistive effect magnetic head employing a spin valve film.

2. Description of the Related Art

In keeping up with the tendency towards a smaller size and a larger recording capacity of a hard disc device, an increasing demand is raised for a small-sized hard disc device of, for example, 2.5 inch size, especially for a usage in which application to a portable personal computer is a possibility.

With such small-sized hard disc, the medium speed is lowered depending on the disc diameter, so that, in a conventional induction type magnetic head in which the playback output depends on the medium speed, the playback output is lowered to frustrate the endeavor to raise the recording capacity.

On the other hand, with a magneto-resistive effect type magnetic head (MR head) exhibiting the magneto-resistive effect, that is a magnetic head in which resistivity is changed with the magnetic field, its playback output is not dependent on the medium speed, such that a high playback output can be realized even at a low medium speed. For this reason, attention is being directed to the MR head as a magnetic head capable of realizing a high recording capacity with a small-sized disc.

The MR head is such a magnetic head for reproduction exploiting the magneto-resistive effect in which the value of the electrical resistance is varied with the direction of magnetization, and the direction of the current flowing in the head, as may be evidenced in transition metals. Specifically, should the stray magnetic flux from a magnetic recording medium be received by the MR film, the direction of magnetization of the MR film is reversed by this magnetic flux, such that the direction of magnetization is at an angle to the direction of the current flowing in the MR film which is related with the quantity of the magnetic flux. This varies the electrical resistance of the MR film and a voltage change corresponding to this variation in electrical resistance appears across the ends of the MR film through which flows the sense current.

Therefore, the magnetic recording signals can be read out with this voltage change as a voltage signal. At this time, a bias voltage is applied so that an operating point of the MR film will be a point of superior linearity in resistance change with respect to the external magnetic field and the maximum resistance change of the MR film, that is an optimum bias point.

The MR head is prepared by forming the above MR film, an electrode film or an insulating film by the thin film technique and by etching these films by a photolithographic technique. Also, with this MR head, a shield structure comprised of lower and upper magnetic poles arranged on upper and lower sides of the MR film s used in order to set a gap length during reproduction to prevent intrusion of unneeded magnetic flux to the MR film.

Specifically, with the so-called longitudinal MR head in which the sense current flows in the direction perpendicular to the track axis direction, a first insulating film, a soft magnetic film, as a lower magnetic pole, and a second insulating film, formed of $Al_2O_3$ or $SiO_2$, are layered sequentially. On the second insulating film is arranged a substantially rectangular MR film so that its longitudinal direction is substantially perpendicular to the magnetic recording medium sliding surface and so that its end face is exposed to the magnetic recording medium sliding surface. On both ends in the longitudinal direction of the MR film are arranged a forward end electrode an a rear end electrode for furnishing the sense current to the MR film. On the MR film is arranged an insulating film formed of, for example, $Al_2O_3$ or $SiO_2$. This insulating film is sandwiched between the forward end electrode and the rear end electrode. On the insulating film is arranged a bias conductor facing the MR film for applying a bias magnetic field thereto. On the bias conductor is arranged an insulating film on which a soft magnetic film is layered as an upper magnetic pole to complete the MR head.

The MR film is a film of a magnetic material displaying the magneto-resistive effect.

On the other hand, a giant magneto-resistive effect film, having a multi-layered structure combined from plural materials for exhibiting the giant magneto-resistive effect, is attracting attention. Among the giant magneto-resistive effect films, there is a spin valve film having a simpler structure and in which the electrical resistance is changed with a weaker magnetic field.

Basically, the spin valve film has a four-layered structure of a first ferromagnetic layer, a non-magnetic layer, a second ferromagnetic layer and an anti-ferromagnetic layer, arranged in this order. By separating the first ferromagnetic layer and the second ferromagnetic layer by the non-magnetic layer and by providing the anti-ferromagnetic layer on the second ferromagnetic layer, the second ferromagnetic layer contacted with the anti-ferromagnetic layer is magnetized in a pre-set direction. This second ferromagnetic layer is referred to hereinafter as a pin layer. On the other hand, the first ferromagnetic layer separated by the non-magnetic layer does not assume a fixed direction of magnetization. This ferromagnetic layer is referred to hereinafter as a free layer. That is, the pin layer and the free layer are higher and lower in coercivity, respectively.

If a magnetic field is applied across above-described the spin valve film, the free layer is magnetized to set the direction of magnetization. The resistance of the spin bulb film is maximum and minimum if the direction of magnetization of the free layer is 180° opposite to that of the pin layer and if the direction of magnetization of the pin layer is the same as that of the pin layer, respectively.

However, with the MR head employing a spin valve film, magnetic domain control of the free layer is crucial. The free layer devoid of a preset direction of magnetization is of a magnetic domain structure in which the magnetic pole is not exposed to outside, as shown in FIG. 1, in order to avoid increase in magnetostatic energy in the absence of the effect of an external magnetic field. If, in a state in which there are a large number of magnetic domains of different directions of magnetization in the free layer of the spin valve film, an external magnetic field is applied across the free layer, the directions of magnetization are moved in unison to render uniform the directions of magnetization in the free layer. Since the magnetic wall is destroyed during transition from the multiple magnetic domains to the unitary magnetic domain, there is produced the noise termed the Barkhausen noise which is applied to an output waveform.

SUMMARY OF THE INVENTION

It is therefore an object of the present invention to provide a magnetically stable magneto-resistive effect magnetic head employing a spin valve film in which the direction of magnetization of the free layer is rendered uniform even in the absence of the external magnetic field.

According to the present invention, there is provided a magneto-resistive effect type magnetic head including a magneto-resistive effect film of a planar substantially rectangular configuration, having its longitudinal direction substantially perpendicular to a magnetic recording medium sliding surface, a first electrode connected to a longitudinal end of said magneto-resistive effect film, a second electrode connected to the other longitudinal end of said magneto-resistive effect film and hard magnetic films arranged on both ends along the width of said magneto-resistive effect film. The magneto-resistive effect film is made up at least of a first ferromagnetic layer, a non-magnetic layer, a second ferromagnetic layer and an anti-ferromagnetic layer, layered together. The electrical resistance other hard magnetic films is higher than that of the magneto-resistive effect film.

In the present magneto-resistive effect type magnetic head, the magnetic domain of the magneto-resistive effect film is stabilized by the hard magnetic films. With the present magneto-resistive effect magnetic head, since the electrical resistance of the hard magnetic films is higher than that of the magneto-resistive effect film, the current hardly flows through the hard magnetic layers.

Also, with the present magneto-resistive effect type magnetic head, since the magnetic domain of the spin valve film is controlled by the hard magnetic films, it is possible to suppress the Barkhausen noise to assure optimum reproduction. Also, since the electrical resistance of the hard magnetic films is higher than that of the magneto-resistive effect film, as described above, the current hardly flows through the hard magnetic layers to prevent the current loss.

DESCRIPTION OF THE PREFERRED EMBODIMENTS

Figure 1:
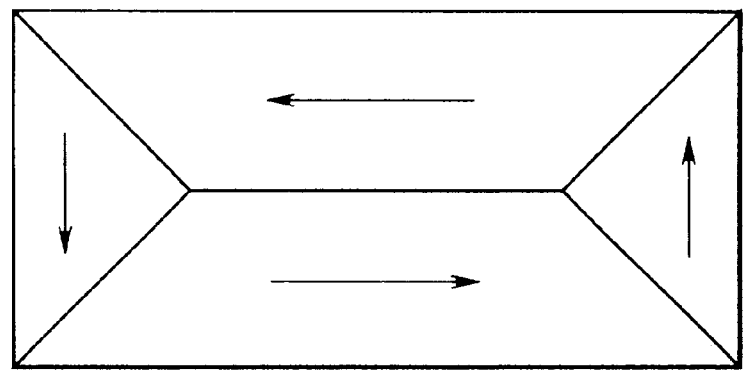
FIG. 1 is a schematic cross-sectional view showing a magnetic domain structure of a free layer.

Referring to the drawings, preferred embodiments of the present invention will be explained in detail.

Figure 2:
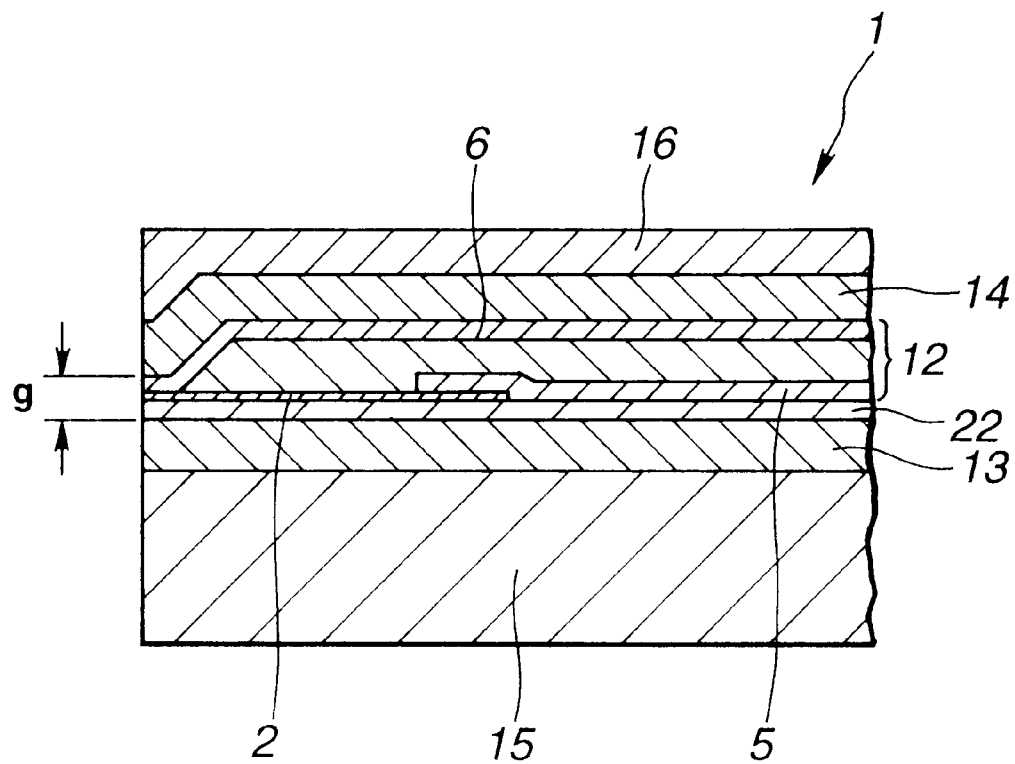
FIG. 2 is a cross-sectional view showing an illustrative structure of a MR head according to the present invention.

An illustrative structure of a magneto-resistive effect magnetic head (MR head) 1 of the present invention is shown in FIG. 2.

The MR head 1 includes a spin valve type magneto-resistive effect device (SV type MR device) 12 sandwiched between a lower magnetic shield 13 and an upper magnetic shield 14. The SV type MR device 12 has a planar substantially rectangular spin valve film 2, a rear end electrode 5 and a forward end electrode 6, which will be explained subsequently.

The upper magnetic shield 14 is connected to the forward end electrode 6 in the SV type MR device 12 and is bent in the vicinity of a facing surface to the magnetic recording medium so as to be extended at an upper side towards the rear end electrode 5. The upper magnetic shield 14, formed of an electrically conductive material, also plays the role of a lead portion for the forward end electrode 6. The spacing between the upper magnetic shield 14 and the lower magnetic shield 13 serves as a magnetic gap g.

This MR head 1 is a so-called longitudinal type MR head in which the SV type MR device 12 is arranged so that the longitudinal direction of the spin valve film 2 is substantially perpendicular to a signal recording surface of the magnetic recording medium and so that the forward end of the spin valve film 2 serves as a facing side to the magnetic recording medium.

In the above-described longitudinal type MR head 1, the SV type MR device 12 is arranged via lower magnetic shield 13 and insulating film 22 on a substrate 15 of a non-magnetic material, such as $Al_2O_3$-TiC, and a protective film 16 is arranged on the upper magnetic shield 14.

In the above longitudinal type MR head 1, a signal magnetic field from the magnetic recording medium (external magnetic field) can be detected by exploiting the fact that the spin valve film 2 undergoes resistance changes by an external magnetic field.

The SV type MR device 12, used in the above-described MR head 1, is hereinafter explained.

Figure 3:
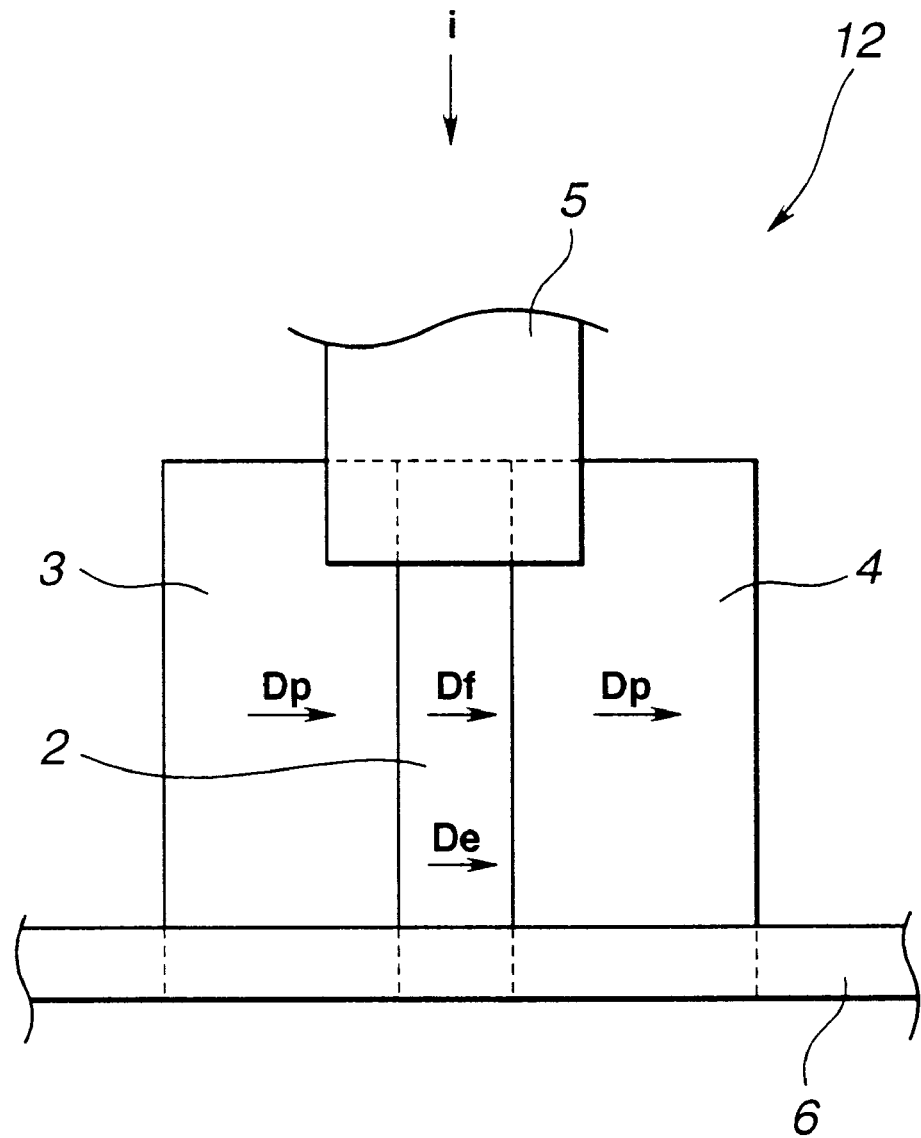
FIG. 3 is plan view showing an illustrative structure of a SV type MR device 12.
Figure 4:
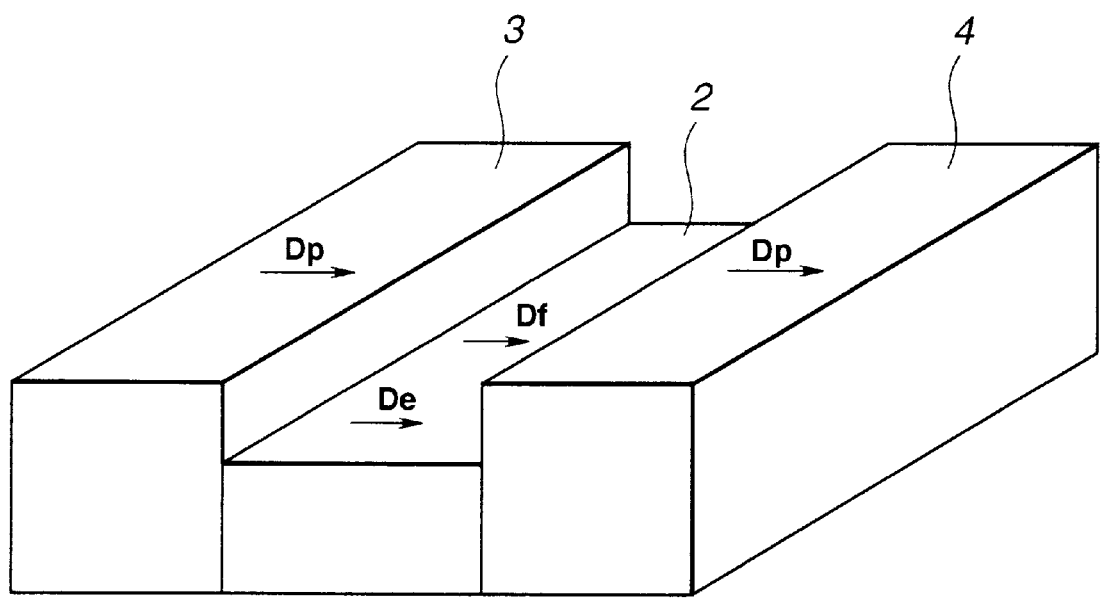
FIG. 4 perspective view showing an illustrative structure of SV type MR device 12.

An illustrative structure of the SV type MR device 12 is shown in FIGS. 3 and 4 which are a plan view and a schematic perspective view of the SV type MR device 12, respectively.

The SV type MR device 12 includes planar substantially rectangular spin valve film 2 and planar substantially rectangular hard magnetic films 3, 4 arranged on both ends along the width of the spin valve film 2, as shown in FIG. 3. This SV type MR device 12 also includes a rear end electrode 5, connected to a longitudinal end of the spin valve film 2, and a forward end electrode 6, connected to the opposite side end of the spin valve film 2, as shown in FIG. 3. The one and the opposite side ends of the spin valve film 2 are referred to hereinafter as a rear end and a forward end, respectively.

The rear end electrode 5 and the forward end electrode 6 are provided in superimposition on the longitudinal ends of the spin valve film 2 in order to permit the sense current i to flow in the spin valve film 2 from the rear end electrode 5 towards the forward end electrode 6.

Figure 5:
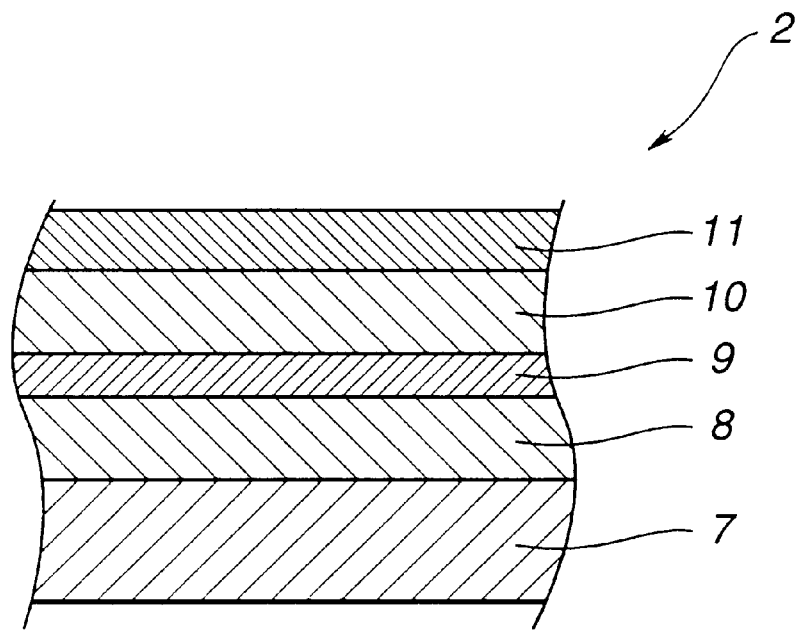
FIG. 5 is a cross-sectional view showing an illustrative structure of a spin valve film 2.

The spin valve film 2 is comprised of a free layer 8, a non-magnetic layer 9, a pin layer 10, and an anti-ferromagnetic layer 11, layered in this order on a substrate 7 comprised of a substrate 16 on which the lower magnetic shield 13 and the insulating film 22 are formed in this order, as shown in FIG. 5.

In the spin valve film 2, the direction of magnetization Df of the free layer 8 is rotated under the effect of the external magnetic field. The resistance of the valve bulb film 2 is changed depending on an angle between the direction of magnetization of the free layer 8 and that of the pin layer 10.

Therefore, with the SV type MR device 12, the external magnetic field can be detected by exploiting the resistance changes in the spin valve film 2.

The free layer 8 and the pin layer 10 may be formed of any suitable known soft magnetic materials. Specifically, NiFe, NiFeCo, Permalloy alloys NiFe-X, where X denotes Ta, Cr, Nb, Rh, Zr, Mo, Al, Au, Pd, Pt or Si, alone or in combination, may be used.

As the non-magnetic layer 9, Cu, CuNi or CuAg may be used.

As the anti-ferromagnetic layer 11, IrMn, RhMn, PtMn, FeMn, CrMnPt, NiO or NiCoO may be used.

On both sides of the spin valve film 2 are arranged hard magnetic films 3, 4 of a hard magnetic material.

The hard magnetic films 3,4 generate a bias magnetic field having components parallel to the width of the spin valve film 2 to control the direction of magnetization Df of the free layer 8. The direction of magnetization Dp of the hard magnetic films 3, 4 is parallel to the width-wise direction of the spin valve film 2.

The bias magnetic field herein encompasses an exchange bias magnetic field.

If the coercivity of the hard magnetic films 3, 4 is sufficiently large, magnetization of the hard magnetic films 3, 4 is ferromagnetically coupled to that of the free layer 8 so that the direction of magnetization Df of the free layer 8 is in the same direction as the direction of magnetization Dp of the hard magnetic films 3, 4. Thus, if a bias magnetic field sufficient to overcome the longitudinal magnetostatic anisotropy can be applied, the direction of magnetization Df of the free layer 8 can be set to the width-wise direction with a smaller bias magnetic field. However, if a sufficiently large bias magnetic field can be applied, there is no necessity of setting the direction of easy axis De of the free layer 8 to the width-wise direction.

If direction of magnetization Df of the free layer 8 can be set to the width-wise direction, the distribution of magnetization of the free layer 8 can be stabilized to a sole magnetic domain state, so that magneto-resistive characteristics of the spin valve film 2 can be stabilized and freed of hysteresis.

As the materials making up the hard magnetic films 3, 4, it is desirable to use ferrite represented by the formula of $MO\text{-}Fe_2O_3$, where M denotes a divalent metal ion. The material of the hard magnetic films 3, 4 may be exemplified by Co-containing $\gamma\text{-}Fe_2O_3$.

In the SV type MR device 12, the hard magnetic films 3, 4 are preferably formed of a material exhibiting a resistivity higher than that of the spin valve film 2. By employing a material higher in resistivity than the spin valve film 2 as the hard magnetic films 3, 4, the majority of the sense current i flows through the spin valve film 2, even if the hard magnetic films 3, 4 are contacted with the area of the spin valve film 2 operating effectively as a magnetically sensitive portion, thus reducing current losses and the lowering in output. If a material of the hard magnetic films 3, 4 higher in resistivity than the spin valve film 2 is used, there is no necessity of providing insulation between the hard magnetic films 3, 4 and the spin bulb film 2 to suppress current losses by a simpler configuration.

The resistivity of the routinely used spin valve film 2 is usually of the order of 50 to 100 $\mu\Omega$cm. On the other hand, the resistivity ferrite used for the hard magnetic films 3, 4 of the SV type MR device 12 is of the order of 0.1 $\Omega$cm. Therefore, the majority of the sense current i flow through the spin valve film 2, while it scarcely flows through the hard magnetic films 3, 4, thus enabling suppression of current losses.

If the hard magnetic films 3, 4 are arranged on the ends along the width of t the spin valve film 2, so as to be substantially symmetrical with respect to a centerline parallel to the longitudinal direction of the spin valve film 2, the hard magnetic films 3, 4 may be arranged at any suitable position between one and the other ends of the spin valve film 2. If the hard magnetic films 3, 4 are arranged continuously across the one and the other ends in the longitudinal direction of the spin valve film 2, the magnetic domain can be stabilized throughout the entire spin valve film 2.

Figure 6:
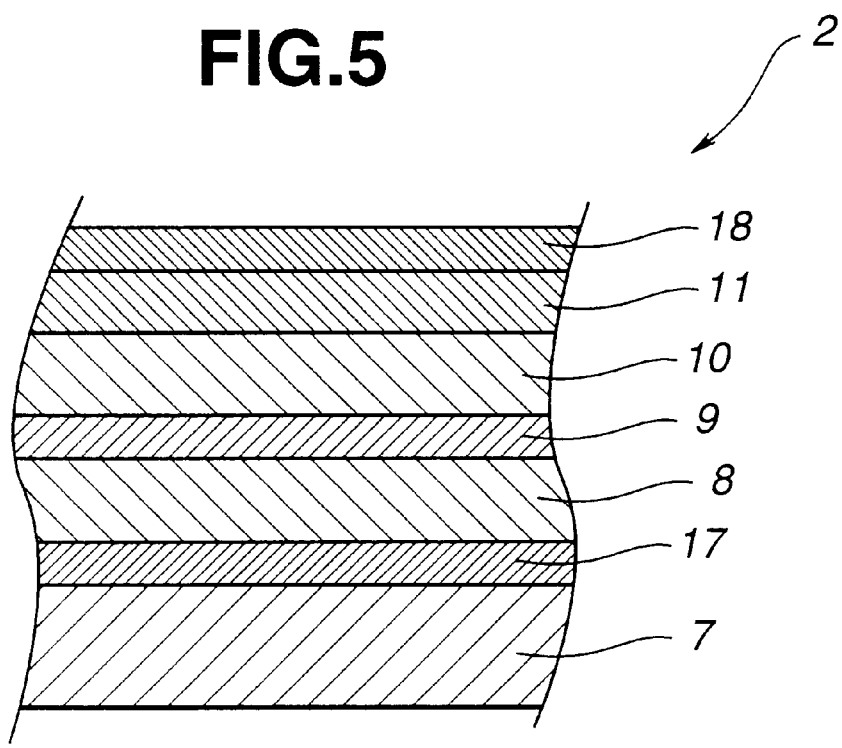
FIG. 6 is a cross-sectional view showing another illustrative structure of a spin valve film 2.

In the above-described MR head 1, the spin valve film 2 may include a non-magnetic protective film 18 of Ta on an underlying layer of a non-magnetic film 17 of Ta or on the anti-ferromagnetic layer 11, as shown in FIG. 6.

In addition to Ta, non-magnetic materials, such as Ti or Hf, may be enumerated as a material for the protective film 18.

Figure 7:
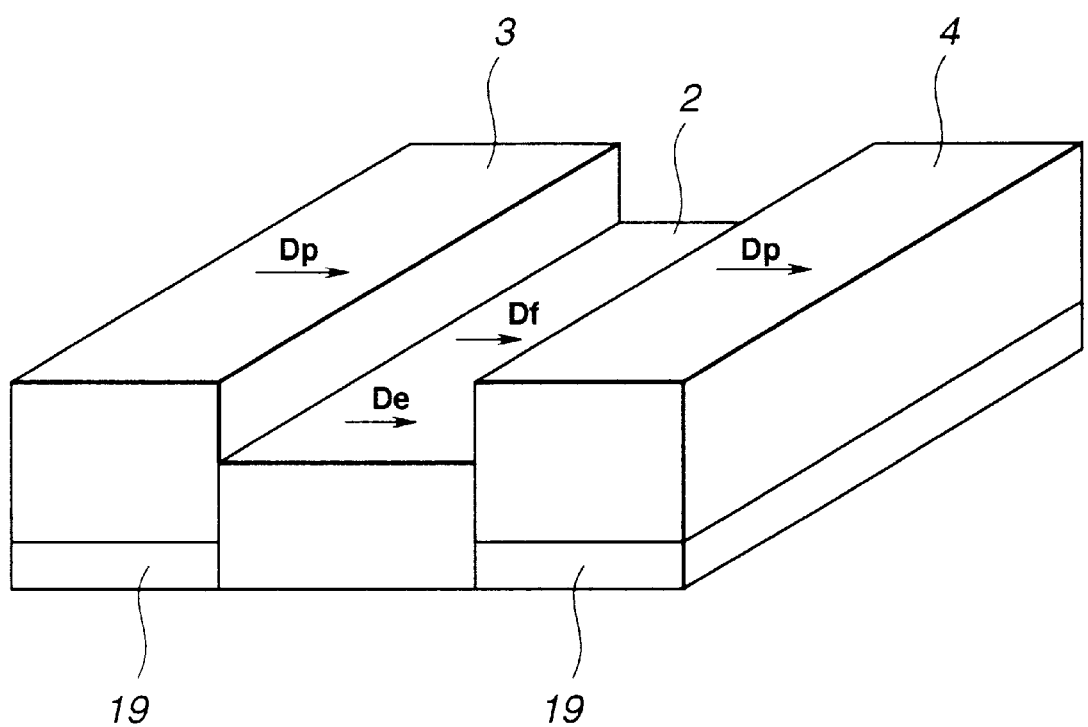
FIG. 7 is a perspective view showing essential portions of the SV type MR device 12.

Also, in the MR head 1, an underlying film 19 may also be formed on the hard magnetic films 3, 4, as shown in FIG. 7. The hard magnetic films 3, 4 may be improved in in-plane coercivity by providing the underlying film 19 on the hard magnetic films 3, 4. As the underlying film 19, metal oxides, such as NiO, CoO or ZnO are used as the underlying film 19.

The relation between the strength of the magnetic field and the output voltage of the SV type MR device 12, configured as shown in FIG. 4, was checked.

Specifically, the spin valve film 2 is produced by layering a NiFe film, 6.3 nm, a CoFe film 2 nm thick, a Cu film, 2.5 nm thick, a CoFe film, 2 nm thick and a RhMn film, 10 nm thick, on an underlying film of, for example, Ta, 10 nm thick, in this order, and by layering a protective film of ta, 10 nm thick, on the RhMn film. In this case, the NiFe and CoFe films serve as a free layer, with the CoFe film serving as a pin layer. The Cu film serves as a non-magnetic layer, with the RhMn film serving as an anti-ferromagnetic layer.

Figure 8:
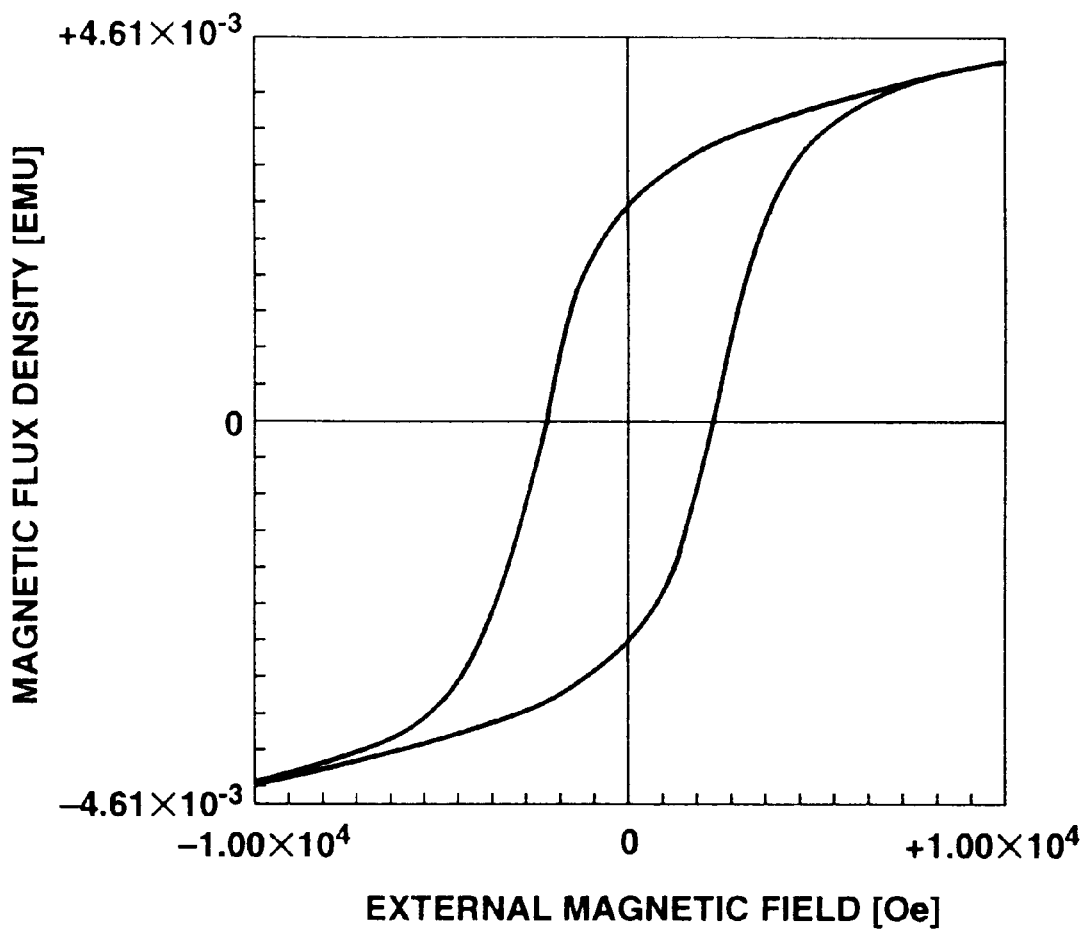
FIG. 8 is a graph showing a magnetization curve of Co-containing $Fe_2O_3$ used in hard magnetic films 3, 4.

Specifically, the hard magnetic films 3, 4 are obtained by forming a film of Co-containing $\gamma\text{-}Fe_2O_3$, having a magnetization curve shown in FIG. 8, to a thickness of 71 nm.

Figure 9:
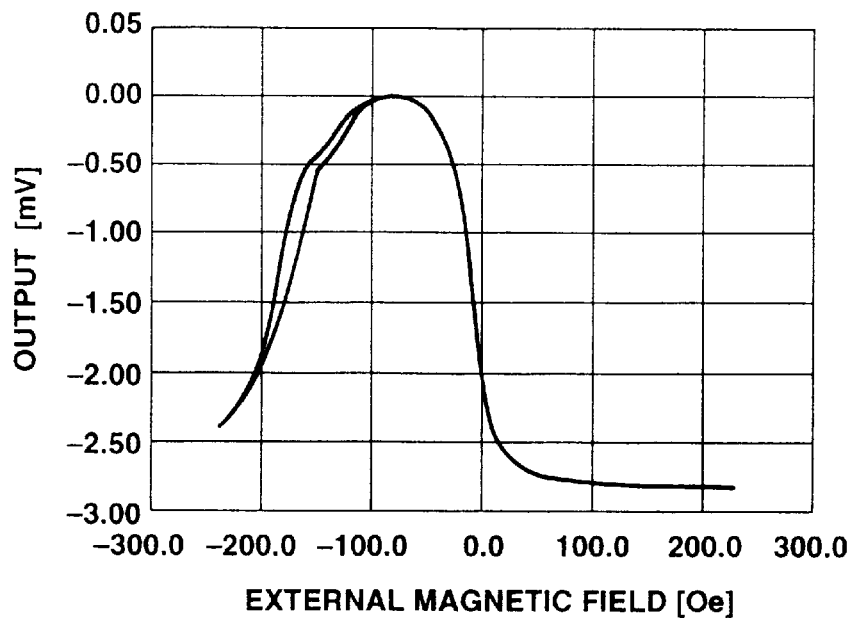
FIG. 9 is a graph showing the relation between the externa magnetic field and the output voltage of the SV type MR device 12 shown in FIG. 4.
Figure 10:
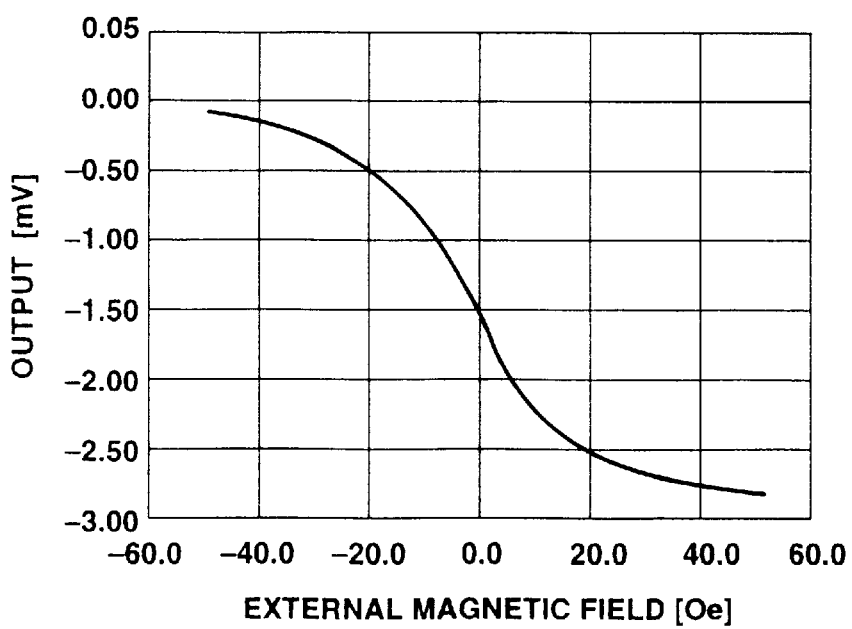
FIG. 10 is a graph also showing the relation between the externa magnetic field and the output voltage of the SV type MR device 12 shown in FIG. 4.
Figure 11:
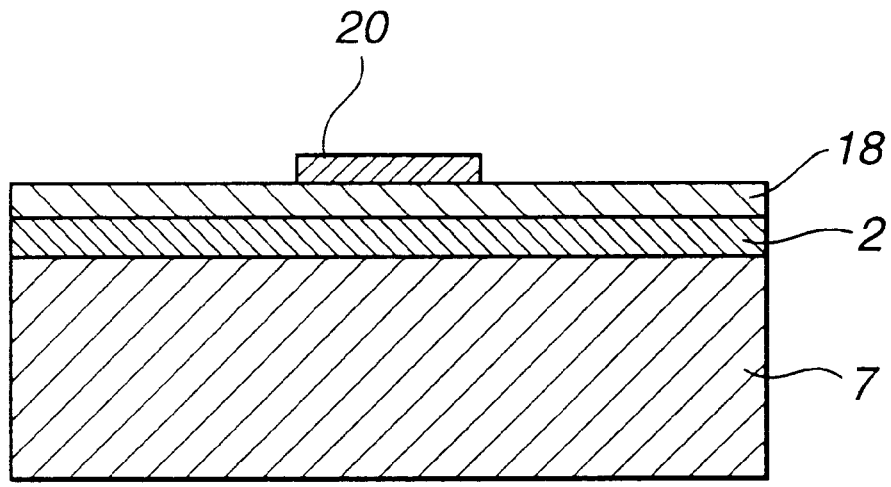
FIG. 11 is a cross-sectional view showing the state in which a spin valve film and a protective film are formed on a substrate and a resist pattern is formed thereon, for explanation of the manufacturing method of the SV type MR device 12.

FIG. 9 show the graph showing the relation between the strength of the magnetic field and the output voltage of the SV type MR device 12 under the conditions of the track width of 1.0 μm, a length of the magnetically sensitive portion of 5.0 μm and the sense current of 1 mA. FIG. 10 is a graph showing a low magnetic field portion of FIG. 9 to an enlarged scale. It is seen from FIGS. 9 and 10 that the curve is smooth, suffers from hysteresis to a lesser extent and is free of the Barkhausen noise.

The above-described SV type MR device 12 is fabricated as follows:

First, a free layer, a non-magnetic layer, a pin layer and an anti-ferromagnetic layer are formed on a substrate 7 of a non-magnetic material in this order to form the spin valve film 2.

As materials of the respective layers, making up the spin valve film 2, any suitable known materials, commonly used as materials of the respective layers of the spin valve film 2, may be used. Also, as methods for forming these layers, any suitable known methods usually employed for forming respective layers of the spin valve film 2 may be employed.

On the spin valve film 2, thus formed, a protective film 18 of a non-magnetic material, is formed. Then, a resist 20 is coated on the protective film 18, and a resist pattern of a desired shape, not shown, is formed thereon by a photo-lithographic technique.

Figure 12:
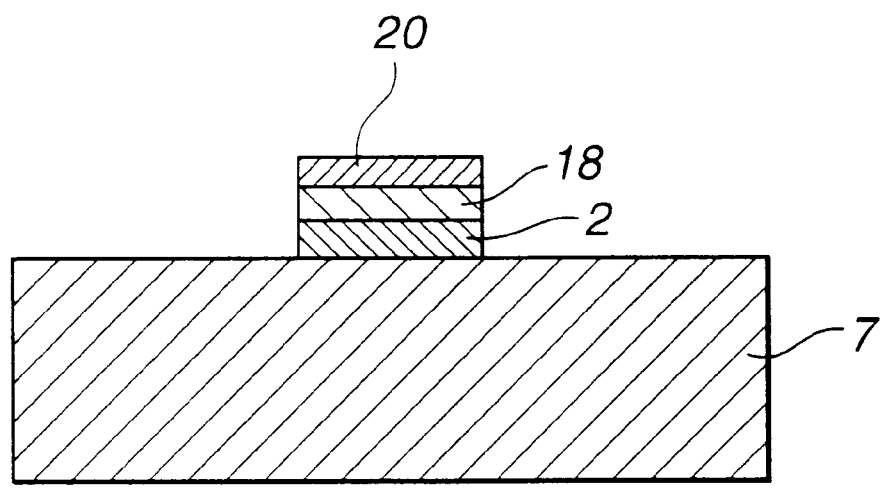
FIG. 12 is a schematic cross-sectional view showing the state of etching with the resist pattern of FIG. 11 as a mask.

The protective film 18 then is etched, using this resist pattern as a mask, as shown in FIG. 12, to forma a subsequently rectangular planar spin valve film 2, as shown in FIG. 12.

Figure 13:
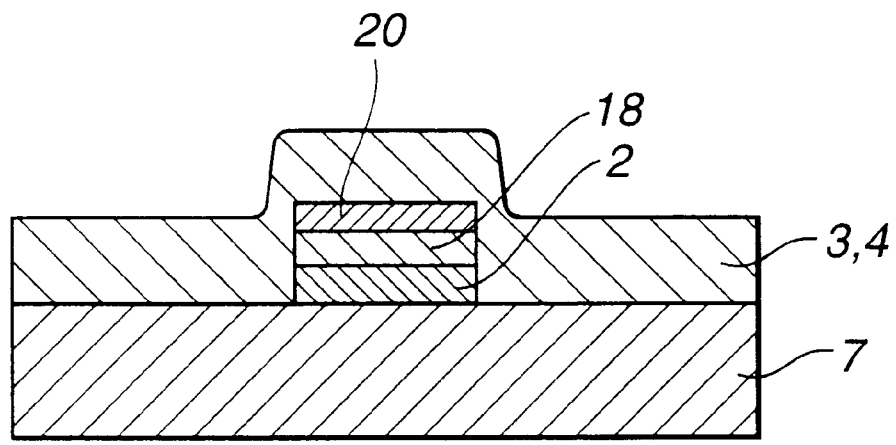
FIG. 13 is a schematic cross-sectional view showing the state in which a hard magnetic film has been formed, with the resist pattern of FIG. 12 being left intact.

Then, hard magnetic films 3, 4 are formed, with the resist pattern being left intact, as shown in FIG. 13.

Figure 14:
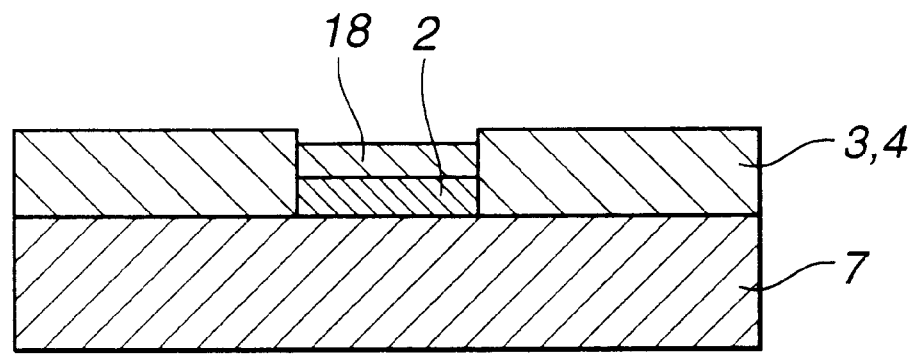
FIG. 14 is a schematic cross-sectional view showing the state of liftoff of a resist pattern of FIG. 13.

Finally, the resist 20 is removed by lift-off, after forming the hard magnetic films 3, 4, to produce a SV type MR device 12 having hard magnetic films 3, 4 formed on both sides along the width of the spin valve film 2 as shown in FIG. 14.

Figure 15:
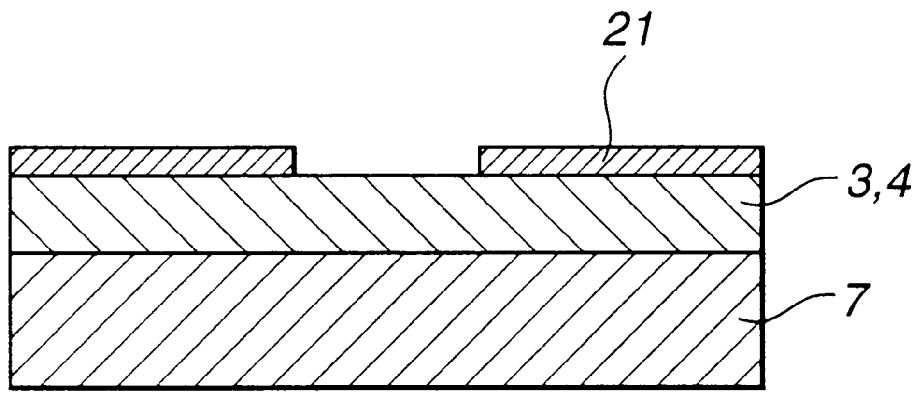
FIG. 15 is a schematic cross-sectional view showing the state in which a hard magnetic film is formed on a substrate and a resist pattern is formed thereon, for explanation of the manufacturing method of the SV type MR device 12.

The SV type MR device 12 may also be produced as follows:

First, hard magnetic films 3, 4 are formed on a substrate 7 formed of a non-magnetic material, as shown in FIG. 15.

Then, a resist 21 is formed on the hard magnetic films 3, 4, thus produced, to form a resist pattern of a desired shape, not shown, by a lithographic process.

Figure 16:
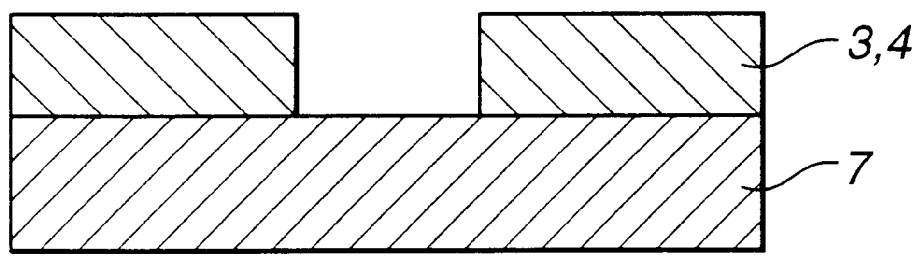
FIG. 16 is a schematic cross-sectional view showing the state of lift-off of the spin valve film of FIG. 15.

Then, using this resist pattern as a mask, the hard magnetic films 3, 4 are etched to remove the resist pattern to produce the hard magnetic films 3, 4, as shown in FIG. 16.

Figure 17:
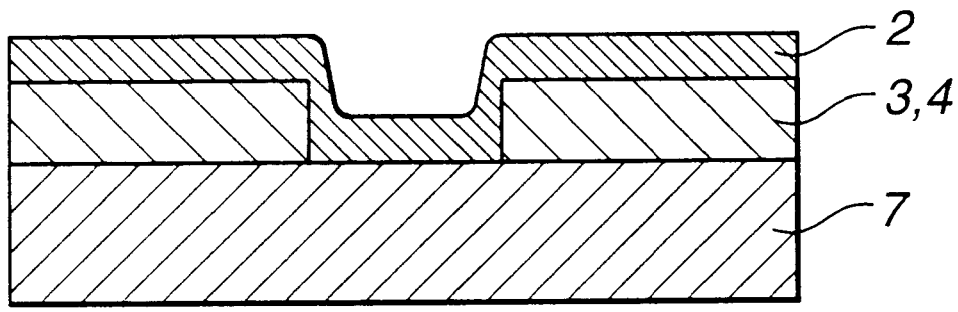
FIG. 17 is a schematic cross-sectional view showing the state of forming of the spin valve film of FIG. 16.

Then, a spin valve film 2 is formed, as shown in FIG. 17. The spin valve film 2 is prepared using any suitable known material or method routinely used for the preparation of the spin valve film 2.

Figure 18:
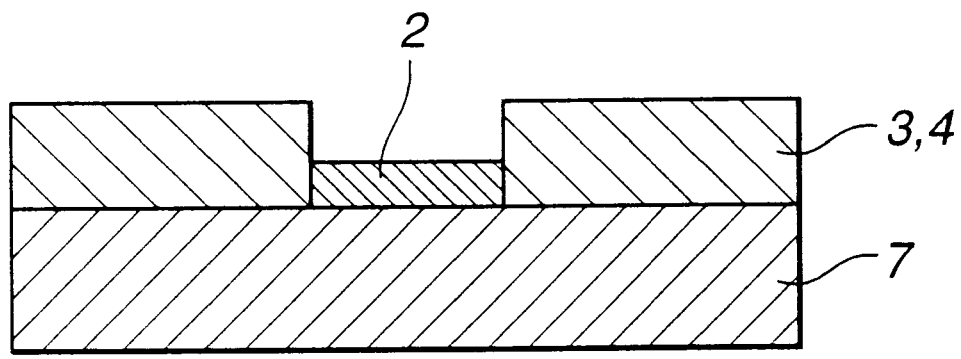
FIG. 18 is a schematic cross-sectional view showing the state of etching of the spin valve film of FIG. 17.

Finally, the spin valve film 2 is etched, as shown in FIG. 18, to produce a SV type MR device 12 having hard magnetic films 3, 4 formed on both sides along the width of the spin valve film 2.

In the above-described MR head 1, it is an area of the spin valve film 2 over the length of the magnetic gap extending from its distal end facing the facing surface to the magnetic recording medium to a rear portion that is affected by the signal magnetic field (external magnetic field). In the SV type MR device 12, used herein, the hard magnetic films 3, 4 are arranged over the entire area along the length of the spin valve film 2, while the direction of magnetization Df of the spin valve film 2 is controlled sufficiently in the area of the spin valve film 2 affected by the signal magnetic field (external magnetic field). Thus, with the MR head 1, employing the SV type MR device 12, optimum playback is assured without production of the Barkhausen noise.

What is claimed is:

1. A magneto-resistive effect type magnetic head comprising:

a magneto-resistive effect film of a planar substantially rectangular configuration, having its longitudinal direction substantially perpendicular to a magnetic recording medium sliding surface;

a first electrode connected to a longitudinal end of said magneto-resistive effect film;

a second electrode connected to the other longitudinal end of said magneto-resistive effect film; and hard magnetic films arranged on both ends along the width of said magneto-resistive effect film;

said magneto-resistive effect film being made up at least of a first ferromagnetic layer, a non-magnetic layer, a second ferromagnetic layer and an anti-ferromagnetic layer, layered together;

said hard magnetic films having an electrical resistance larger than that of the magneto-resistive effect film.

2. The magneto-resistive effect type magnetic head according to claim 1 wherein said hard magnetic films are of a composition of $MO\text{-}Fe_2O_3$, where m is a divalent metal ion.

3. The magneto-resistive effect type magnetic head according to claim 1 wherein said hard magnetic films are composed of Co-containing $\gamma\text{-}Fe_2O_3$.

4. The magneto-resistive effect type magnetic head according to claim 1 wherein an underlying film composed of $Ni_2O$, CoO or ZnO is provided below said hard magnetic films.

* * * * *